Patented Feb. 28, 1950

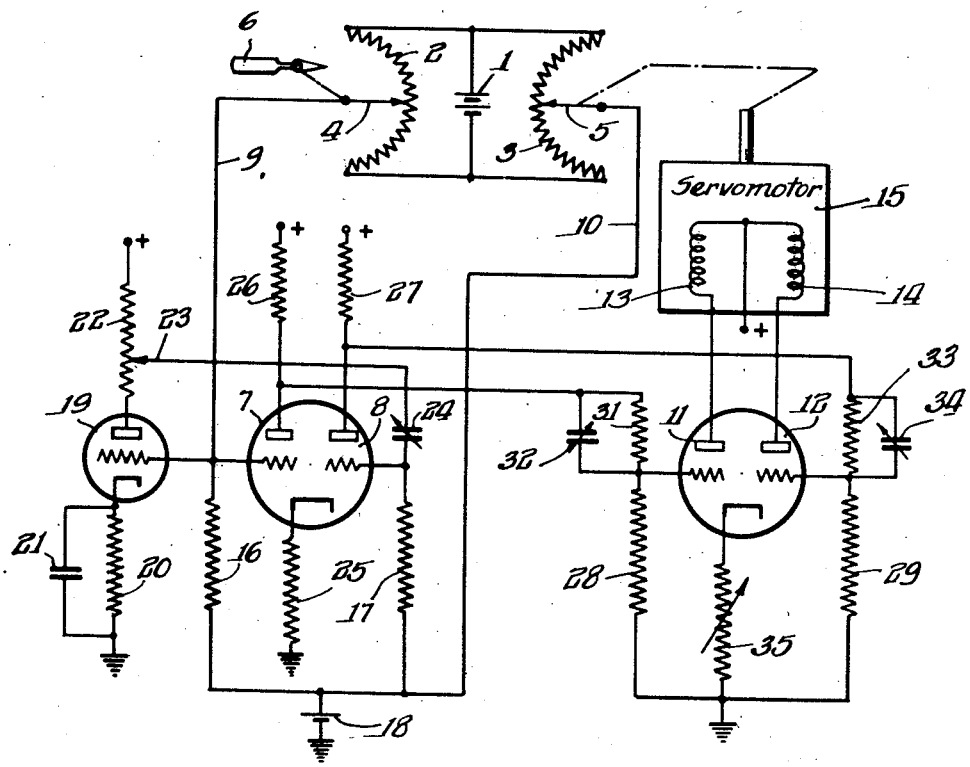

2,499,222

UNITED STATES PATENT OFFICE 2,499,222

FOLLOW-UP SYSTEM

Robert Hofstadter, Forest Hills, N. Y., assignor to The Norden Laboratories Corporation, New York, N. Y., a corporation of Connecticut Application July 17, 1946, Serial No. 684,208

5 Claims. (Cl. 318—29)

My invention relates to follow-up systems and more particularly to an improved follow-up system for controlling the operation of a servomotor and the like.

Heretofore numerous follow-up systems have been devised, but they generally have had such disadvantages as lack of angular precision in follow-up action, hunting, chattering or an appreciable out-of-step or out-of-phase position both dynamically and statically.

Certain systems, heretofore, have also been incapable of handling large moments of inertia. Where follow-up systems have been used for the control of servomotors, they have frequently employed relays which have introduced a certain amount of delay in the follow-up action.

One object of my invention is to provide an improved follow-up system which will obviate the disadvantages of the prior art.

Another object of my invention is to provide an improved follow-up system which may be applied directly to the control of a servomotor without the need of auxiliary relays or equipment.

A further object of my invention is to provide a follow-up system which employs a novel antihunt circuit for controlling the operation of a servomotor.

Still another object of my invention is to provide an improved follow-up system which operates in accordance with the magnitude, sign and rate of change of the control signal.

A further object of my invention is to provide a follow-up control system particularly suited for a servomotor of the variable torque type which will have a high precision follow-up movement for both dynamic and static conditions.

Other and further objects of my invention will appear from the following description:

The accompanying drawing which forms a part of the instant specification and which is to be read in conjunction therewith is a circuit diagram of a follow-up system showing one embodiment of my invention.

In general, my invention contemplates a follow-up system which is responsive to the magnitude and sign of a control signal and also responsive to the rate of change of the control signal. My invention employs any suitable means for generating a control signal such as a bridge network which may be unbalanced to initiate a follow-up action and which when unbalanced produces a signal voltage. I provide a circuit which is responsive to both the magnitude and direction of the resultant signal voltage, and the circuit is also responsive to the rate of change of the signal voltage. The follow-up control of a servomotor is obtained by mixing or combining voltage components proportional to the magnitude and direction of the control signal and proportional to direction of the change of signal and to the rate of change of the signal. Resultant control voltages are obtained to control the operation of the electrical responsive means constituting a part of the servomotor. The operation is such that a high degree of accuracy is obtained in the follow-up control without appreciable lag, overrun, or hunting. For a 360° control of rotation, the static difference between the controller and the follow-up is less than 0.1° and under dynamic conditions the error is increased only by approximately thirty per cent.

It will be understood that for purposes of illustration I have shown a bridge network adapted to produce a control signal. In actual use, the control signal may be produced in any desired manner as long as a uni-directional voltage is ultimately applied to the control grids.

In order to obtain a servomotor system in combination with my follow-up circuit, the circuit must be balanced against the servomotor. Any suitable type of servomotor may be employed, as for example those employing clutches, those employing reversible armature current, those employing reversible field current, or those employing a magnetic amplifier with alternating current motor.

The time lag of the system is constituted by components comprising the delay between the pick-up system of the control signal and the time delay residing in the servomotor per se. In the pick-up system the lag is principally electrical. If an alternating current with a rectifier and filler is employed, the time lag of the pick-up system will vary between five and twenty milliseconds, using the conventional four hundred cycle alternating potential. The servomotor time lag is caused by the inertia of the moving parts, friction and the electrical parameter of the servomotor circuit. This is due principally to inductive impedance. In my follow-up system the circuit is such that the values may be adjusted to introduce corresponding leads to overcome lags such that the system is substantially balanced within the operating range to produce the minimum of operating delay.

Referring now to the drawing, a bridge network is shown having a source of potential 1 connected across one diagonal of the bridge which includes two voltage dividers 2 and 3 provided with adjustable contact arms 4 and 5 respectively. The voltage divider 2 together with its adjustable contact arm 4 may be considered as being the control or transmitting station. The adjustable contact 4 is arranged to be moved by some means which may be a manually operable control arm 6 or any equipment which has a movement which is to be followed by other equipment. The adjustable contact arm 5 on the voltage divider 3 is the follow-up station where the adjustable contact arm 5 is moved by the follow-up equipment which may include a servomotor. When the bridge network which is energized by the source of potential 1 is unbalanced, a voltage difference will exist and current flow will occur between the adjustable contact arms 4 and 5. This voltage difference which may be termed an error or unbalance signal is supplied to a control circuit which employs a plurality of vacuum tubes.

The control circuit employs a pair of vacuum tubes 7 and 8 which may be individual matched vacuum tubes in separate envelopes or as is preferable a twin vacuum tube in a single envelope. The twin vacuum tube has the advantage of providing more nearly matched characteristics for each set of electrodes thus obviating the necessity for carefully matching tubes as is the case where individual envelope tubes are employed. The pair of vacuum tubes 7 and 8 are arranged to be responsive to the signal voltage appearing across the conductors 9 and 10 which are connected to the adjustable contact arms 4 and 5 of the bridge network. The vacuum tubes 7 and 8 have output circuits arranged to control the energization of a pair of vacuum tubes 11 and 12 which preferably are also triodes contained in a single envelope. The vacuum tubes 11 and 12 control the energization of relay coils 13 and 14 of a servomotor 15.

The vacuum tubes 7 and 8 are arranged to be controlled in accordance with the magnitude and sign of the signal voltage appearing across the conductors 9 and 10 and also in accordance with the rate of change of this signal voltage. accordingly the vacuum tubes 7 and 8 are provided with grid resistors 16 and 17 which are connected to the positive terminal of a source of biasing voltage 18. The biasing voltage 18 is so selected as to provide the proper operating level of the vacuum tubes 7 and 8. The one conductor 10 is connected to the juncture between the grid resistors 16 and 17 and the positive terminal of the biasing source of voltage 18. The other conductor 9 is connected to the grid of the vacuum tube 7 and also to the grid of another vacuum tube 19.

The vacuum tube 19 is provided with a cathode resistor 20 which is suitably by-passed by a capacitor 21. The anode of the vacuum tube 19 is connected to an anode coupling resistor 22 which in turn is connected to the positive terminal of a suitable source of anode voltage. The anode resistor 22 is provided with an adjustable contact 23 which is connected to a coupling capacitor 24 which in turn is connected to the grid of vacuum tube 8. The vacuum tube 19 is provided with a cathode resistor and by-pass capacitor so as to permit the vacuum tube to operate at fairly high positive input potentials. The degenerative action of the resistor 20 is overcome by the capacitor 21 so that the proper sensitivity of the tube 19 is obtained. The vacuum tube 19 operates as a sign reversing tube similar to the operation of a phase reversal tube where alternating current signals are applied. The coupling capacitor 24 together with the grid resistor 17 of the vacuum tube 8 operates as a differentiating circuit so that in response to a change in the signal appearing across the conductors 9 and 10, a varying or transient signal is applied to the grid of the vacuum tube 8. As will subsequently become apparent the application of this potential to the grid of the vacuum tube 8 produces an action which is reflected upon the operation of the vacuum tube 7 so that in the output circuits of these vacuum tubes a combined response action is obtained.

The vacuum tubes 7 and 8 have their cathodes connected to a biasing resistor 25 which has an effect to combine or mix the magnitude of the signal with the rate of change of the signal appearing across the bridge circuit conductors 9 and 10. The anodes of the vacuum tubes 7 and 8 are connected through anode coupling resistors 26 and 27 respectively to suitable positive terminals of a source of anode voltage for the control circuit. The grid circuits of the vacuum tubes 11 and 12 include grid coupling resistors 28 and 29 which are connected directly to ground. Interposed between the anode resistor 26 and the grid coupling resistor 28 is a resistor 31 which is in parallel to a coupling capacitor 32. Interposed between the anode resistor 27 and the grid resistor 29 is a resistor 33 which is in parallel to a coupling capacitor 34. The resistors 31 and 33 provide a form of direct coupled amplification between the two vacuum tube stages so as to maintain a certain conductivity of either of the vacuum tubes 11 and 12 dependent upon the unbalance signal voltage being supplied to the vacuum tubes 7 or 8. The coupling capacitors 32 and 34 respond immediately to changes in the grid biasing voltages to produce an action which anticipates the application of the respective biasing voltage on the grids of vacuum tubes 11 and 12 and hence reduces lag or overrun.

The anodes of vacuum tubes 11 and 12 are connected through the relay coils 13 and 14 of the servomotor to the positive terminal of the source of anode voltage. The cathodes of the vacuum tubes 11 and 12 are connected to an adjustable self-biasing resistor 35 which may be adjusted so as to provide the proper operating characteristic of these vacuum tubes, particularly at low plate current values. It will be noted that the grid electrodes of the vacuum tubes 11 and 12 are connected to circuits which in effect constitute voltage divider circuits. Thus for example the grid of the vacuum tube 11 is connected to the juncture between the resistors 28 and 31 which form a part of a voltage divider circuit including the anode resistor 26 across which the anode voltage appears.

Let us consider now the operation of my follow-up system. Neglecting for the moment the effect of tube 19 and its associated circuit connections, we will assume that the control handle 6 has been moved to cause contact arm 4 to create a potential difference between conductors 9 and 10 whereby a more positive potential is applied to the grid of tube 7. The increase of the grid potential in a positive direction will increase the plate current in tube 7. This increase in plate current will increase the IR drop through cathode resistor 25 and the IR drop through anode resistor 26. The increase of the IR drop through resistor 25 will increase the positive cathode bias of the common cathode of tubes 7 and 8. This increase in the cathode bias will reduce the plate current flowing through the plate circuit of tube 8. The increase of the IR drop through anode resistance 26 will reduce the positive potential applied to the grid of tube 11 thus reducing the plate current in tube 11. The reduction in the plate current in tube 8 will reduce the IR drop through anode resistance 27 thus increasing the positive potential impressed on the grid of tube 12 causing an increase in the plate current in tube 12 and energizing the winding 14 of the servomotor 15. The reduction of plate current in the tube 11 will reduce the IR drop through cathode resistor 35 thus reducing the positive bias applied to this cathode. This in turn causes a further increase in the current flowing through the plate circuit of tube 12 augmenting the current in the winding 14 of the servomotor.

The servomotor will then operate to move contact arm 5 to a position balancing the potential difference created by the movement of arm 4 and the action will stop when the balance is substantially achieved, the potential difference then being reduced to below operating level.

Let us consider now the action of the change in potential in a positive direction upon tube 19. The increase of positive potential upon the grid of tube 19 will increase the plate current flowing through that tube. This increases the IR drop in anode resistance 22 and hence reduces the positive potential applied to the grid of tube 8 through the capacitor 24. The capacitor 24 passes only changes in potential, and accordingly responds only to transients or changes in voltages. The reduction in the positive potential applied to the grid of tube 8 will reduce the plate current flowing through that tube. The decrease in the plate current will cause a drop in the potential across the anode resistor 27 which results in an increase in the positive potential applied to the grid of tube 12 thus causing an increase in the current flowing through the plate circuit of this tube which includes the winding 14 of the servomotor control. The reduction in plate current of tube 8 will reduce the potential across cathode resistor 25, thus reducing the positive bias applied to the cathode. A reduction in the cathode bias produces an increase of the plate current through tube 7. This increases the potential drop across anode resistance 26 thus reducing the positive potential applied to the grid of tube 11. This further reduces the plate current flowing through tube 11 which reduces the potential drop across the cathode resistor 35 reducing the positive bias on the cathode of tube 12 thus further increasing the plate current flowing in the plate circuit of this tube.

Let us now consider the action of the application of a reduced potential upon the grid of tube 7 neglecting for the moment the action of tube 19 and its associated circuit. A reduction of positive potential upon the grid of tube 7 reduces the plate current flowing through that tube. This reduces the potential drop across anode resistance 26 and cathode resistance 25. The reduction of the potential drop across anode resistance 26 will increase the positive potential applied to the grid of tube 11 thus increasing the plate current flow in this tube. The reduction of the positive biasing potential on the cathode to which resistor 25 is connected will increase the plate current flowing through tube 8. This increase of plate current will increase the potential drop across anode resistor 27 thus reducing the positive potential applied to the grid of tube 12, reducing its plate current flow. This in turn decreases the potential drop across cathode resistor 35 thus reducing the positive bias upon the cathode of tube 11 which will result in an increase in the plate current flow of the plate circuit of the tube 11 and augmenting the action of the positive potential theretofore applied upon the grid of tube 11. The reduction of flow in plate current of tube 12 and the increase of the plate current in tube 11 will result in the energization of the winding 13 of the servomotor control and the de-energization of the winding 14. The servomotor will then drive the contact arm 5 in the opposite direction following the contact arm 4 until balance is achieved, and no potential difference or a minimum potential difference exists across grid resistance 16.

Let us consider now the action of tube 19 and its associated circuit when there is a change in potential from the positive to the negative direction. The decrease in positive potential upon the grid of tube 19 causes a reduction in the flow of the plate current of that tube. This reduces the potential drop across anode resistor 22 increasing the positive potential applied to the grid of tube 8 through the capacitor 24, which results in an increase in the flow of the plate current of tube 8. The drop in potential across the cathode resistor 25 thus increases the cathode bias which further reduces the flow of plate current through tube 7. This in turn further reduces the IR drop across anode resistor 26 thus making the grid of tube 11 more positive and increasing the flow of the current through its plate circuit. The increase in the plate current in tube 8 also increases the potential across resistance 27 thus decreasing the positive potential applied to the grid of tube 12 and decreasing the flow of plate current in that tube. This decrease in plate current reduces the potential across cathode resistor 35 thus reducing the cathode bias of tube 11 and permitting a further increase in the plate current flowing through tube 11.

Due to the fact that the grid of tube 8 is isolated by the capacitor 24 only changes in voltage will be applied thereto. The action of tube 19 therefore is approximately effective as a function of change of potential of the control signal. It is to be further noted that the action of tube 19 may augment the action of tubes 7 and 8 or may oppose their action.

Let us consider some operating conditions. Suppose contact arm 4 is being moved in a direction to place a positive potential upon conductor 9 with respect to conductor 10 and the follow-up arm 5 is moving in a direction agreeable to the movement of contact arm 4 but at a slower rate. In such case the action of tubes 7 and 8 is augmented by the action of tube 19. When the follow-up movement of contact arm 5 is at the same rate as the movement of control arm 4, we have a state equivalent to the application of a steady potential upon the control grids of tubes 7 and 19. In such case there is no change in the rate of potential application and no additional increment of control function will be exercised by the tube 19. The generation of an additional control factor by the tube 19 prevents the lagging of the follow-up arm 5 driven by the servomotor. Suppose now that the servomotor tends to run faster than the movement of the control arm 4 so as to cause arm 5 to move at a greater rate than control arm 4. In such case the potential above cathode applied to the grid of tube 7, if the movement were in a positive direction, would cause tubes 7 and 8 to operate as pointed out above upon the application of a positive potential. The effect, however, of the control arm 5 moving faster than the control arm 4 would be the equivalent of moving control arm 4 in a negative direction from a positive point. Instantaneously the actions resulting from the application of a negative potential upon the control grid of tube 8 would take place, correcting the overrunning of the follow-up arm 5. As soon as the rate of overrun reduces the effect of tube 19 and its associated circuit, the action resulting from the application of a positive potential upon the grids again ensues. Since the control arm is being moved, in the assumption under consideration in a positive direction, it will be apparent that the circuit prevents both overrunning and lagging of the follow-up arm and takes into consideration not only the magnitude of the signal and its direction but also the rate at which the magnitude of the signal and its direction is changing and applies a proper correction so that the resultant control current will operate the servomotor to insure an accurate follow-up without lagging or leading and without chatter and hunt.

The servomotor 15 is shown diagrammatically and is preferably of the variable speed type. A servomotor of this type is shown in the application of Carl L. Norden and Theodore H. Barth, Serial Number 725,604, filed January 31, 1947, in which the servomotor shaft is controlled not only in the direction of rotation but also as to the speed of its rotation within limits. In other words the current density in solenoid winding 14 of the servomotor control will be reflected in a direction of rotation and a speed rotation which is a function of the current density within limits. Similarly the speed of rotation in the opposite direction is governed by current density in the winding 13.

It will be appreciated that no servomtotor has infinite speed or infinite acceleration which would be necessary to eliminate all delay. One of the prime objects of my invention is to reduce the delay to a minimum. This is done by balancing the system against the inherent design of the particular servomotor which is employed. The adjustment of the variable resistor 22 determines the gain of the thermionic valve 19. The value of this resistance plus the value of capacitors 24, 32, and 34 govern the operating characteristics and are the balancing controls. The value of the function of the change in the control signal with respect to time is applied through the grid of thermionic valve 8 through the capacitor 24. The value of this capacitor must be critically adjusted to a range to obtain the best operating characteristics. Thermionic tubes 7 and 8 must be balanced against thermionic tubes 11 and 12. This is done by means of capacitors 32 and 34. If the value of the capacity is too high, overcompensation and chattering will result. If the value of the capacity of capacitors 32 and 34 is too low, lag and hunting of the servomotor will result. The overall sensitivity of response is governed by the value of the resistance 35, though this may be fixed for a given servomotor. The balancing is done empirically by trial and error for the particular servomotor controlled by the follow-up circuit.

For a servomotor of the clutch type, which has an output speed which varies as a function of clutch pressure, a circuit in accordance with my invention would have the resistance 22 set between 25 megohms and 250 megohms, with an optimum value of 100 megohms. The capacitor 24 may be set between .001 microfarad to .002 microfarad with an optimum setting of .0008 microfarad.

The capacitors 32 and 34 may vary between .0001 microfarad to .200 microfarad with an optimum setting of .0005 microfarad. The resistor 35 may have a value between 2000 ohms and 3000 ohms, with an optimum value of 2500 ohms. The resistances 16 and 17, 28 and 29, may be fixed at 1 megohm. The resistors 31 and 30 may be fixed at 10 megohms.

It will be seen that I have accomplished the objects of my invention. My follow-up system will control the speeds agreeable to the speed of movement of the control arm up to the maximum speed permitted by the servomotor with an error during the follow-up action of approximately thirty per cent larger than the error under static conditions which static error it has been pointed out hereinbefore is not greater than ±6' of arc. Due to the anticipating action of the coupling capacitors 32 and 34 and the antihunting action provided by the circuit of vacuum tube 19, an accurate follow-up control system is achieved which will control the servomotor directly without the use of auxiliary apparatus such as associated relays which might otherwise introduce appreciable time delays into the system. My follow-up network may be expeditiously, conveniently and rapidly balanced against a servomotor and with a particular pick-up system to provide an overall system having a minimum delay between signal and response without hunt or chatter. For example, I have built a follow-up system controlling a servomotor of the clutch type with a delay between signal and response of two milliseconds.

When I refer to a control signal, I have in mind the potential applied across the grid resistor 16. I have shown for the purposes of illustration a simple bridge network. It is to be understood, however, that any suitable control system may be used, which will generate a signal which may be converted into a potential across the resistor 16. An alternating current signal may be employed using the conventional 400 signal frequency and employing a rectifier and a filter which will apply a uni-directional potential across resistor 16.

It will be understood that certain features and sub-combinations are of utility and may be employed without reference to other features and sub-combinations. This is contemplated by me and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A control circuit arranged to be actuated by a uni-directional signal of either sign and of variable magnitude including a pair of vacuum tubes arranged to have increased conductivity in response to the magnitude of said signal, one of said tubes being responsive to a signal of one sign to increase conductivity and the other being responsive to a signal of the opposite sign to increase conductivity, vacuum tube circuit means responsive to a function of change of the magnitude of said signals with respect to time for modifying the conductivities of said vacuum tubes, another pair of vacuum tubes arranged to be controlled by said first pair of vacuum tubes, circuit means interconnecting said pairs of vacuum tubes for maintaining said latter pair of vacuum tubes at increased conductivity in accordance with the decreased conductivity of said first pair of vacuum tubes, and circuit means interconnecting said pairs of vacuum tubes for applying a transient potential to said latter pair of vacuum tubes in response to a variation in the rate of conductivity of said first pair of vacuum tubes.

2. A control circuit arranged to be actuated by a uni-directional signal of either sign and of variable magnitude including a pair of vacuum tubes, one of said tubes being responsive to signals of one sign to increase its conductivity and the other being responsive to signals of the opposite sign to increase its conductivity, vacuum tube circuit means responsive to a function of change of the magnitude of said signals with respect to time for modifying the conductivities of said vacuum tubes, another pair of vacuum tubes arranged to be controlled respectively by the vacuum tubes of said first pair of vacuum tubes, circuit means interconnecting said pairs of vacuum tubes for maintaining a corresponding one of said tubes at increased conductivity in accordance with the decreased conductivity of one of said first pair of tubes, and circuit means interconnecting each of said latter tubes with corresponding tubes of said first pair for producing a transient potential in response to a change in the rate of conductivity of the corresponding one of said first tubes.

3. The combination comprising a control circuit arranged to be actuated by a uni-directional signal of either sign and of variable magnitude including a pair of vacuum tubes arranged in a balanced circuit and having a common cathode resistor and a common source of bias potential, an auxiliary vacuum tube having an output circuit capacitively coupled with the input circuit of one of said pair of tubes, and an input circuit responsive to said uni-directional signal connected to the input circuits of the other of said pair of tubes and said auxiliary tube whereby said pair of tubes is arranged to be responsive to a function of change of the magnitude of said signal with respect to time and each of said pair of tubes is responsive to an individual sign of said signal.

4. A control system for a servomotor comprising a follow-up bridge network having a plurality of resistors provided with adjustable contacts, one of said contacts being arranged for selective displacement, and the other of said contacts being arranged for displacement by said servomotor, a vacuum tube circuit including a pair of vacuum tubes arranged in balanced circuit relation having a common cathode resistor, means interconnecting the input circuit of one of said vacuum tubes with the adjustable contacts of said bridge network, an auxiliary vacuum tube having an input circuit connected to said adjustable contacts of said network, a coupling capacitor interconnecting the output circuit of said auxiliary vacuum tube with the input circuit of the other one of said pair of vacuum tubes, a second pair of vacuum tubes arranged in a balanced circuit having an output arranged to control the operation of said servomotor, said latter tubes each having an input circuit comprising a voltage divider connected between the cathode circuit of said tubes and one of the anodes of said first pair of tubes, the grids of said second pair of vacuum tubes being connected to an intermediate point on said voltage dividers, and a plurality of capacitors each connected between the grid of one of said second pair of vacuum tubes and an anode of one of said first pair of vaccum tubes.

5. A control system for a servomotor comprising a follow-up bridge network having a plurality of resistors provided with adjustable contacts, one of said contacts being arranged for selective displacement, and the other of said contacts being arranged for displacement by said servomotor, a vacuum tube circuit including a pair of vacuum tubes arranged in balanced relation having a common cathode resistor and each anode having an anode coupling resistor, means interconnecting the input circuit of one of said vacuum tubes with the adjustable contacts of said bridge network, an auxiliary vacuum tube having an input circuit connected to said adjustable contacts of said network, a coupling capacitor interconnecting the output circuit of said auxiliary vacuum tube with the input circuit of the other one of said pair of vacuum tubes, a second pair of vacuum tubes arranged in a balanced circuit having an output arranged to control the operation of said servomotor, said latter tubes each having an input circuit comprising a voltage divider connected between the grid circuit of said tubes and one of the anodes of said first pair of tubes, the grids of said second pair of vacuum tubes being connected to an intermediate point on said voltage dividers, a plurality of capacitors each connected between the grid of one of said second pair of vacuum tubes and an anode of one of said first pair of vacuum tubes, and a plurality of relays each connected to a different one of the anodes of said latter pair of vacuum tubes for controlling the operation of said servomotor.

ROBERT HOFSTADTER.

REFERENCES CITED

The following references are of record in the file of this patent:

UNITED STATES PATENTS

| Number | Name | Date |
| --- | --- | --- |
| 2,002,353 | Reinken | May 21, 1935 |
| 2,025,218 | Reinken | Dec. 24, 1935 |
| 2,208,623 | Bond | July 23, 1940 |
| 2,398,421 | Frische et al. | Apr. 16, 1946 |
| 2,414,430 | Nisbet | Jan. 14, 1947 |
| 2,439,198 | Bedford | Apr. 6, 1948 |